United States Patent
Ljungqvist

(10) Patent No.: US 6,611,535 B2
(45) Date of Patent: Aug. 26, 2003

(54) METHOD FOR FLOW CONTROL

(75) Inventor: Jonas Haggard Ljungqvist, Bromma (SE)

(73) Assignee: Teracom AB, Stockholm (SE)

( * ) Notice: Subject to any disclaimer, the term of this patent is extended or adjusted under 35 U.S.C. 154(b) by 0 days.

(21) Appl. No.: 10/024,293

(22) Filed: Dec. 21, 2001

(65) Prior Publication Data

US 2002/0080806 A1 Jun. 27, 2002

Related U.S. Application Data

(63) Continuation of application No. PCT/SE00/01335, filed on Jun. 21, 2000.

(30) Foreign Application Priority Data

Jun. 23, 1999 (SE) ................................................ 9902403

(51) Int. Cl.[7] .......................... H04L 12/56; H04L 12/66; H04J 3/16
(52) U.S. Cl. ....................... 370/477; 370/231; 370/236; 370/277; 370/354; 370/356; 370/412; 370/282
(58) Field of Search ................................. 370/229, 230, 370/230.1, 235, 236, 255, 277, 282, 352, 354, 356, 389, 401, 412, 413, 465, 468, 469, 477, 231

(56) References Cited

U.S. PATENT DOCUMENTS

| | | | | |
|---|---|---|---|---|
| 5,872,777 | A | * 2/1999 | Brailean et al. | ............ 370/349 |
| 5,974,028 | A | * 10/1999 | Ramakrishnan | ............ 370/229 |
| 6,104,727 | A | * 8/2000 | Moura et al. | ................ 370/468 |
| 6,105,064 | A | * 8/2000 | Davis et al. | ................. 709/224 |
| 6,215,769 | B1 | * 4/2001 | Ghani et al. | ................. 370/230 |
| 6,252,851 | B1 | * 6/2001 | Siu et al. | ..................... 370/236 |
| 6,272,148 | B1 | * 8/2001 | Takagi et al. | ................ 370/469 |
| 6,418,128 | B1 | * 7/2002 | Takagi et al. | ................ 370/328 |
| 6,473,399 | B1 | * 10/2002 | Johansson et al. | .......... 370/229 |
| 6,493,316 | B1 | * 12/2002 | Chapman et al. | ........... 370/231 |

FOREIGN PATENT DOCUMENTS

| | | | | |
|---|---|---|---|---|
| JP | 10257092 A | * | 9/1998 | ........... H04L/12/56 |
| WO | 98/37670 A1 | | 8/1998 | |

OTHER PUBLICATIONS

Smith et al, Formal Verification of Safety and Performance Properties of TCP Selective Achnowledgment, IEEE Oct. 13–16, 1998, pp. 227–235.*

Samaraweera et al., UK Teletraffic Symposiu7m, IEEE (1998).

Samaraweera et al., International Network Conference, pp. 23–28.

Floyd et al., An Extension to the Selective Acknowledgement (SACK) Option for TCP (1999).

Mathias et al., TCP Selective Acknowledgement Options, (1996).

Goyal et al., Computer Communications and Networks, IEEE, pp. 17–25 (2000).

Goyal et al., Local Computer Networks Proceedings Conference, IEEE, pp. 390–398 (1998).

* cited by examiner

*Primary Examiner*—Hassan Kizou
*Assistant Examiner*—Ahmed Elallam
(74) *Attorney, Agent, or Firm*—Birch, Stewart, Kolasch & Birch, LLP

(57) ABSTRACT

A method of efficiently using Transmission Control Protocol (TCP) with Acknowledgments (ACKs) comprising Selective Acknowledgement (SACK) options in asymmetrical networks by reducing the number of ACKs with SACK options to be transferred back to a sender. New ACKs with SACK options are compared to previous ACKs with SACK options as to their content, and in dependence of the comparison, i.e. if the previous ACK with a SACK option comprises redundant or invalid information and no additional information in relation to the new ACK with a SACK option, then the previous ACK with the SACK option is removed and not sent back to a sender.

9 Claims, 3 Drawing Sheets

METHOD FOR FLOW CONTROL

This application is a Continuation of copending PCT International Application No. PCT/SE00/01335 filed on Jun. 21, 2000, which was published in English and which designated the United States, and on which priority is claimed under 35 U.S.C. §120, the entire contents of which are hereby incorporated by reference.

TECHNICAL FIELD

The present invention generally relates to a method of handling asymmetrical transmissions, specifically information transported by means of transmission control protocol (TCP) via asymmetrical error prone channels.

BACKGROUND

A demand for mobile high capacity data transfers have put high capacity, but unfortunately asymmetrical, wireless broadcasting transmission channels in focus. The majority of all information transfers today are made with the help of Transmission Control Protocol (TCP). Unfortunately this protocol is not designed for neither asymmetrical transmission or wireless error prone transmissions, such as Digital Audio Broadcasting (DAB), Digital Video Broadcasting Terrestial (DVB-T), and Wavelan. Due to this there has come about many different suggestions such as replacing TCP with other modern protocols and modifying TCP to different varying degrees. For information/data transfer via wireless transfer channels special measures have to be taken to be able to manage a low as possible transmitting power. The measures can, for example, be the use of error correcting codes or special retransmission protocols.

To be able to handle bit errors with TCP, a Selective Acknowledgement (SACK) option to Acknowledgements (ACKS) have been developed. By means of the SACK option the TCP transmitter can get to know which packets/segments after the first lost segment that have reached their destination. A SACK option can normally give information of up to three contiguous blocks of segments that are correctly received and also three contiguous blocks of missing or erroneous segments in the information transmission. The use of SACK options presupposes that there is no significant asymmetry in the network so that as many SACIs as information segments transmitted downlink, can be transmitted uplink.

One way of dealing with asymmetry in an extremely asymmetrical network is called ACK-filtering and works on the principles that many of the ACKs that are transmitted back to the transmitter are redundant and do not have to be transmitted. If there is a limitation in the return channel there will emerge a queue and it is in this queue that the ACK-filtering operates.

A combination of these two methods will create problems. SACK options are based on the assumption that there is no limitation in the return channel, and they are thus designed accordingly, and if an ACK-filtering is operated on a SACK queue, i.e. a queue of ACKs with SACK options, then some SACK blocks will be completely removed and then the transmitter will not find out that these blocks have been received. This will lead to the transmitter erroneously retransmitting the segments in these blocks that have already been received. This will result in the downlink transmission channel suffering when bandwidth is used for unnecessary retransmissions.

The problems associated with asymmetrical networks in conjunction with TCP needs to be solved satisfactorily. TCP can handle an asymmetry factor of 50 times the downlink to the uplink in most common implementations. Future networks can have an asymmetry factor of around a 1000 times. There seems to be room for improvement.

SUMMARY

An object of the invention is to define a method for efficiently transferring information fn an asymmetrical network.

Another object of the invention is to define a method of efficiently using TCP with ACKs comprising SACK options in an asymmetrical network.

The aforementioned objects are achieved according to the invention by a method of reducing the number of ACKs with SACK options to be transferred back to a sender. New ACKs with SACK options are compared to previous ACKs with SACK options as to their content, and in dependence of the comparison, i.e. if the previous ACK with a SACK option comprises redundant or invalid information and no additional information in relation to the new ACK with a SACK option, then the previous ACK with the SACK option is removed and not sent back to a sender.

The aforementioned objects are also achieved by a method of, when receiving information in a network that transports information according to the general principles of the Transmission Control Protocol (TCP), reducing the number of selective acknowledgements (SACKs) to be transferred back to a sender. Selective Acknowledgements, SACKs, will generally be used for referring to Acknowledgements (ACKS) with Selective Acknowledgement options. The method comprises a plurality of steps when a new selective acknowledgement has been triggered/generated. In a first step determining if there is a previous selective acknowledgement in a queue to be transferred to the sender, and if there is a previous selective acknowledgment in the queue then further performing the following additional steps. In a first additional step comparing the content of the new selective acknowledgement with the content of the previous selective acknowledgement. Finally in a second additional step removing the previous selective acknowledgement from the queue in dependence on the result of the comparison.

Advantageously in the second additional step of removing the previous selective acknowledgement from the queue, the previous selective acknowledgement is removed from the queue if the previous selective acknowledgement has a different number of blocks than the new selective acknowledgement. Further in the second additional step of removing the previous selective acknowledgement from the queue, the previous selective acknowledgement can and/or also advantageously be removed from the queue if the previous selective acknowledgement has the same number of blocks as the new selective acknowledgement and if only the right edge of the first block is different between the previous selective acknowledgement and the new selective acknowledgement.

In some versions of the invention the method can further advantageously comprise the additional step of sorting the selective acknowledgements in the queue as to which blocks are redundant. Preferably the step of sorting comprises the following four block sorting steps. A first block sorting step of disassembling into blocks the selective acknowledgements that have not been transferred to a sender. A second block sorting step of removing redundant blocks. A third block sorting step of assembling the remaining blocks into block sorted selective acknowledgements. A fourth block sorting step of placing the block sorted selective acknowledgements into the queue. The new selective acknowledgement is preferably not disassembled, but the knowledge of which blocks are comprised in the new selective acknowledgement is used in the second block sorting step for removing redundant blocks. In some versions there are status indicators to keep track of one or both of if and when a queue has been sorted with regard to selective acknowledgements.

The step of sorting can in some version of the method alternatively comprise the following two selective acknowledgement steps. A first selective acknowledgement step of comparing the selective acknowledgements that have not been transferred to a sender. A second selective acknowledgement step of removing the redundant selective acknowledgements, i.e. removing selective acknowledgements only comprising redundant blocks that are included in other selective acknowledgements.

In some versions of the method the step of sorting is performed only if the previous selective acknowledgement has not been removed from the queue.

Preferably the method is performed on the output queue in any suitable layer from the TCP layer to the link layer, specifically the method is performed most advantageously on the internet protocol layer output queue.

By providing a method for removing Selective Acknowledgements (SACKS) from an output queue a plurality of advantages over prior art systems are obtained. A primary purpose of the invention is to, in a simple manner, enable the use of highly asymmetrical networks. According to the invention this is achieved primarily by making simple, and thus quickly executable, comparisons between the contents of new SACKs and previous SACKs and removing a previous SACK if the content is redundant and/or invalid. There is thus no loss of SACK information which could lead to unnecessary retransmissions. By reducing the number of SACKs that have to be sent back, a network with a higher asymmetry factor can be used. Other advantages of this invention will become apparent from the description.

BRIEF DESCRIPTION OF THE DRAWINGS

The invention will now be described in more detail for explanatory, and in no sense limiting, purposes, with reference to the following figures, in which.

DETAILED DESCRIPTION

Figure 1:
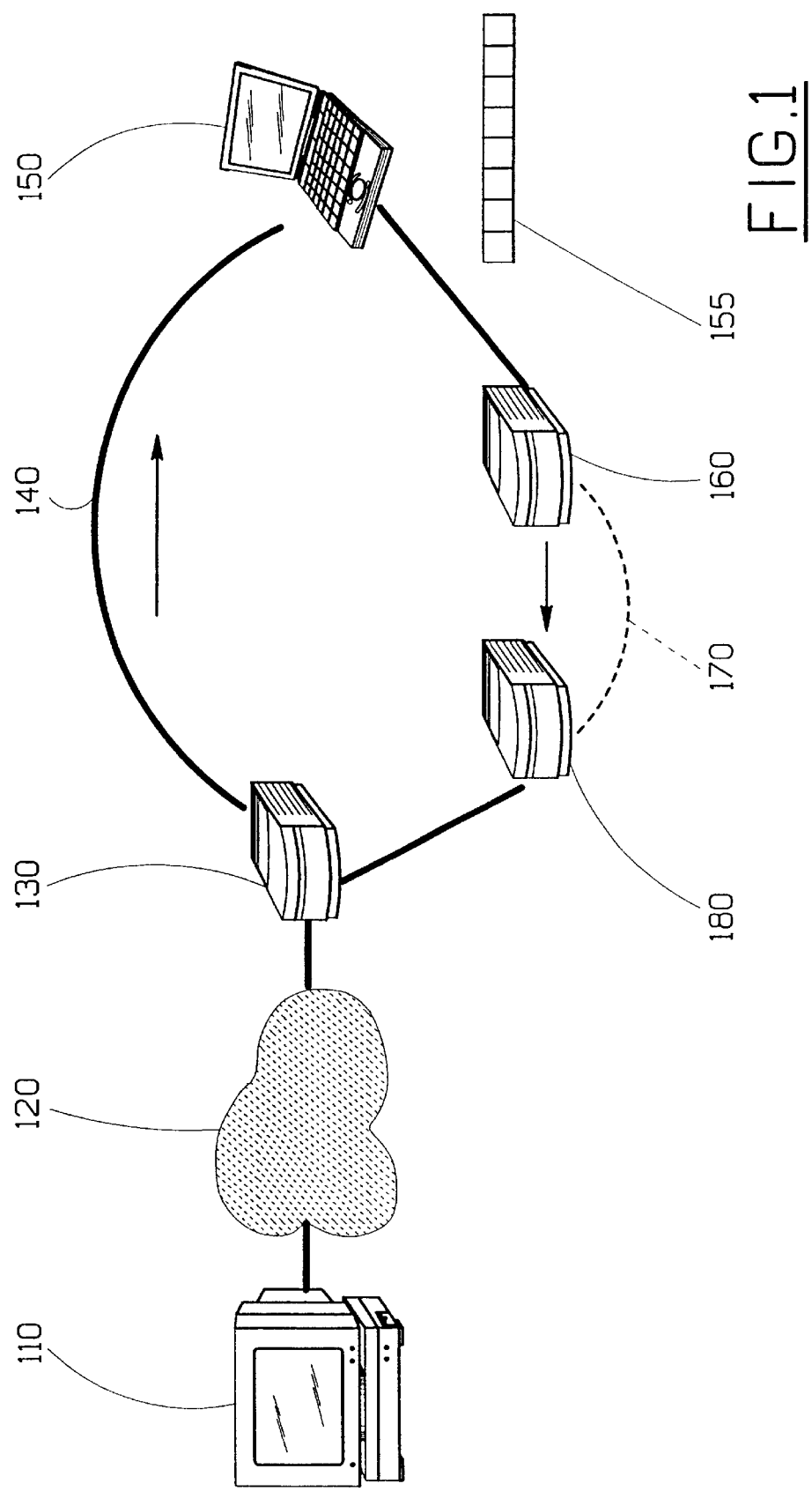
FIG. 1 shows an asymmetrical transmission system.

In order to clarify the method and device according to the invention, some examples of its use will now be described in connection with FIGS. 1 to 3.

The invention concerns information transfers in networks, especially asymmetrical networks. FIG. 1 shows an asymmetrical transmission network on which the invention is intended to operate. An information consumer 150 communicates with a first uplink gate 160 which transfers download data requests via a low capacity back channel 170 to a second uplink gate 180 which transfers requests to a connection network 120 such as internet, onto which a desired information provider 110 is connected. The low capacity back/uplink channel 170 might be a telephone network or a mobile cellular mobile telephone network in which case the first uplink gate 160 and the second uplink gate 180 can be modems. After having received the request and information on how to transfer the requested information to the information consumer 150, the information provider 110 will transfer the desired information, if it is available, to the information consumer 150 via the connection network 120, a downlink gate 130 and a high capacity downlink channel 140. The high capacity downlink channel can, for example, be a high capacity broadcasting system such as a Digital Audio Broadcasting (DAB) system, a Digital Video Broadcasting Terrestial (DVB-T) system, or a cable TV network.

As mentioned previously, it is advantageous to use ACKs with SACK options, which will simply be referred to as SACKs. With SACKs an information consumer 150 can inform the sender about all segments that have arrived successfully, so the sender need retransmit only the segments that have actually been lost. A SACK can normally comprise information of up to three contiguous blocks of segments that are correctly received and also up to three contiguous blocks of missing or erroneous segments in the information transmission. The first block of a SACK always relate to the segment that triggered it. Each block represents received bytes of data that are contiguous and isolated, i.e. the bytes below the block (Left Edge of Block minus 1), and just above the block (Right Edge of Block), have not been received. The Left Edge of a Block is the first sequence number of this block and the Right Edge of the Block is the sequence number immediately following the last sequence number of this block.

Following is a short example of how an ACK with a SACK option works. It is assumed that the left window edge is 5000 and that the data transmitter sends a burst of 8 segments, each containing 500 data bytes.

| | | | SACK option blocks | | | | | |
|---|---|---|---|---|---|---|---|---|
| Sent | Received/ Trigger | ACK | First Left Edge | First Right Edge | Second Left Edge | Second Right Edge | Third Left Edge | Third Right Edge |
| 5000 5500 | 5000 | 5500 | | | | | | |
| 6000 6500 | 6000 | 5500 | 6000 | 6500 | | | | |
| 7000 7500 | 7000 | 5500 | 7000 | 7500 | 6000 | 6500 | | |
| 8000 | 8000 | 5500 | 8000 | 8500 | 7000 | 7500 | 6000 | 6500 |

The first segment, 5000, is received and triggers an ACK 5500 indicating that segment 5500 is not received. The second segment, 5500, is lost, nothing further happens. The third segment, 6000, is recieved and triggers an ACK 5500 [6000 6500; --; --], i.e. an ACK with a SACK option. This indicates to the transmitter that the second segment is lost and by means of the SACK option that segment 6000 (bytes 6000 to 6499) has been received and not segment 6500 and further. The fourth segment, 6500, is lost, no reaction. The fifth segment, 7000, is received and triggers an ACK 5500 [7000 7500; 6000 6500; --]. The sixth segment, 7500, is lost, no action. The seventh segment, 8000, is received and triggers an ACK 5500 [8000 8500; 7000 7500; 6000 6500].

SACKs presupposes that the network used for information transfer is fairly symmetrical, i.e. that there is no practical limitations id in the uplink channel 170 for transferring SACKs back to the sender. In an asymmetrical network according to FIG. 1 an output queue 155 full of SACKs will form at or around the information consumer 150 or the first uplink gate 160 due to limitations in the uplink channel 170. This will cause delays in the transfer of SACKs to the downlink gate 130 and/or the information provider 110. This in turn will also put restrictions on the transfer of information on the downlink channel 140, because there are restrictions on how much information is sent without any confirmation of it being received or not. There is thus a need to eliminate any unnecessary delays returning SACKs. According to the invention, SACKS are compared as to their content to determine if they can be discarded or not. This is preferably performed on the SACKs in the output queue 155.

When the SACKs are compared as to their content three different cases arise. A first case is when the new SACK has more blocks than the previous SACK. A second case is when the new SACK has fewer blocks than the previous SACK. Finally a third case is when the new SACK has the same number of blocks as the previous SACK.

The first case when the new SACK has more blocks than the previous SACK, then the previous SACK is redundant and can be removed. SACKs use a stack principle with push and pop where it always tries to report the latest blocks. This means that the new SACK will comprise all of the blocks of the previous SACK and one or more new blocks. The previous SACK is thus redundant in that it does not contain any information that is not in the new SACK. For example a previous SACK has been triggered, ACK 10 [18 19; 11 17; --], segments 20 to 24 arrives triggering a new SACK, ACK 10 [20 25; 18 19; 11 17], making the previous SACK redundant.

The second case when the new SACK has fewer blocks than the previous SACK, then the previous SACK contains old invalid information and can be removed. Because SACKs always comprise the maximum number of blocks that is possible (in most implementations it is three blocks) this means that if the new SACK comprises fewer blocks, then new data has arrived to the receiver and filled one of the holes of data. The previous SACK thus comprises old invalid information and can be removed. For example a previous SACK is ACK 10 [20 25; 18 19; 11 17], the receiver then receives segment 19 triggering a new SACK, ACK 10 [18 25; 11 17; --], making the previous SACK redundant.

Finally a third case is when the new SACK has the same number of blocks as the previous SACK. This case needs to be divided into two different events. A first event is when new data is added to the first block. The only thing that is different between the two SACKs is that the first block is different. This means that the previous SACK comprises old invalid information and can be removed. For example a previous SACK is ACK 10 [20 25; 18 19; 11 17], the receiver receives segment 25 triggering a new SACK, ACK 10 [20 26; 18 19; 11 17], making the previous SACK redundant. A second event is when new data give rise to a new block. The new block will be put first in the SACK and push out the last block, i.e. the last block will be shifted out and the previous SACK can thus not be removed. For example a previous SACK is ACK 10 [20 25; 18 19; 11 17], the receiver receives segment 28 triggering a new SACK, ACK 10 [28 29; 20 25; 18 19], i.e. the previous SACK comprises information about segments 11 to 17 that is not comprised in the new SACK, the previous SACK can thus not be removed.

Additionally the SACKs in an output queue can be sorted as to redundant SACKs and blocks, this is especially advantageous in the cases when a previous SACK cannot be removed. According to the invention this can be done in two different ways. In a first output queue redundancy sorting, all the blocks of the SACKs in the queue are put in a separate place/queue where all the redundant blocks are removed, whereafter new SACKs are put together with the remaining non-redundant blocks and put into the output queue. A newly triggered SACK is preferably not stripped of its blocks but only used for the determination of which blocks are redundant. In a second, and preferred, output queue redundancy sorting, the blocks of the SACKs in the output queue are compared to thus be able to remove SACKs that are completely redundant.

Figure 2:
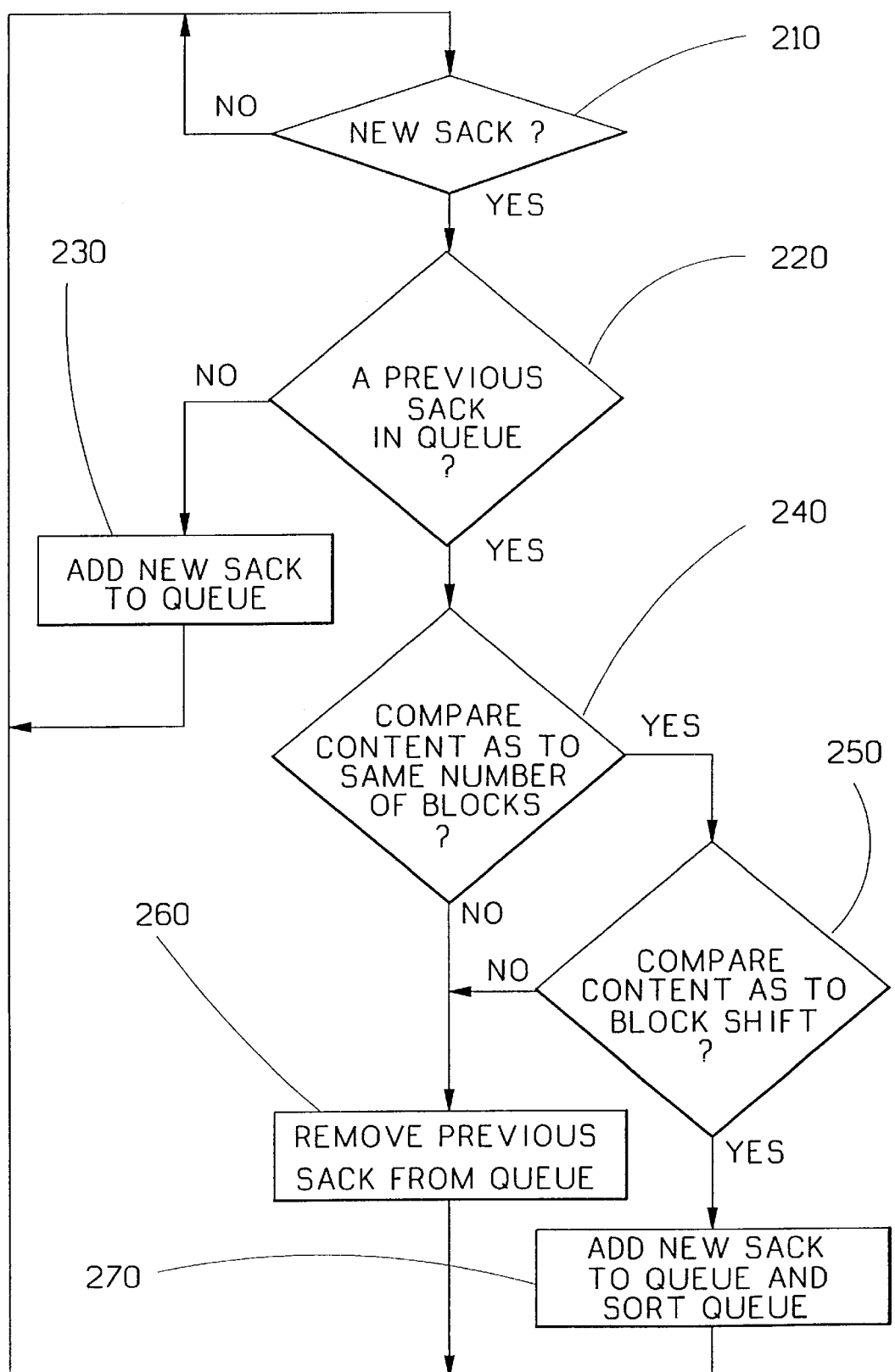
FIG. 2 shows a flow chart of a method according to the invention.

FIG. 2 shows a flow chart of a method according to the invention. A first step 210 awaits the generation/triggering of a new SACK. When a new SACK has been generated to be transmitted back to a sender then the procedure determines in a second step 220 if there is any previous SACKS in an output queue which comprises SACKS to be transmitted back to the sender. If there are no SACKS in the output queue then the procedure continues with a third step 230 that simply adds the new SACK to the output queue, whereafter the procedure returns to the first step 210. In the second step 220 if it is instead determined that there is a previous SACK in the output queue, then the procedure continues with a fourth step 240. The fourth step 240 compares the contents of the new SACK with the contents of the previous SACK, more specifically the number of blocks in the two SACKs are compared. If the two SACKs have the same number of blocks then the procedure continues with a fifth step 250, and if they have a different number of blocks then the procedure continues with a sixth step 260. The fifth step 250 also compares the contents of the new SACK with the contents of the previous SACK, more specifically in this step the contents of the two SACKs are compared to determine if there has been a block shift. If there has been a block shift then the procedure continues with a seventh step 270, otherwise, if there has not been a block shift, then the procedure continues with the sixth step 260. The sixth step 260 removes the previous SACK from the output queue, adds the new SACK to the output queue and then the procedure continues with the first step 210. The seventh step 270 adds the new SACK to the output queue and then attempts to remove redundant blocks from the SACKs in the output queue by sorting and removing either just redundant blocks or by removing redundant SACKS. Thereafter the procedure continues with the first step 210.

Figure 3:
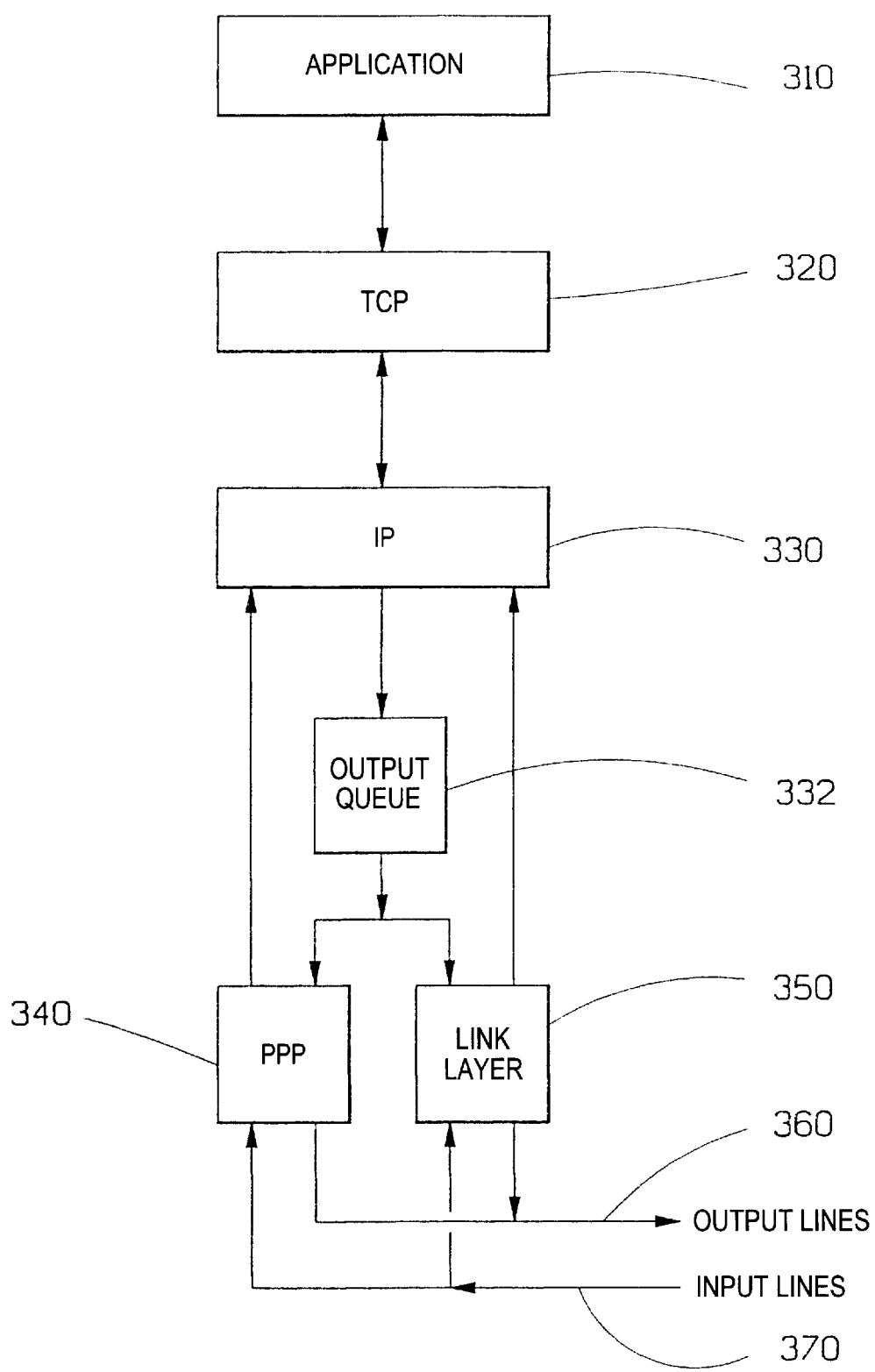
FIG. 3 shows the layered architecture of an information consumer according to the invention.

FIG. 3 shows the layered data communication architecture of an information consumer according to the invention. A layer refers to a process or a device inside a computer system, which is designed to perform a specific function. An application 310 is for our purposes the information consumer that requests downloads of data information, for example. These requests are forwarded to the Transmission Control Protocol (TCP) layer 320, then to the Internet Protocol (IP) 330, down via interfaces such as modems with Point-to-Point Protocols (PPP) 340 or Ethernet 350 to output lines 360. The requested information will, hopefully, after a while appear on the input lines 370 and transported through all the layers up to the application layer 310. SACKs will then be sent back to the sender. The invention will work on any suitable output queue from the TCP layer 320 to after the link layer. Preferably the invention will sort away SACKs on the output queue 332 of the IP layer 330. It is normally not favourable to have the invention filter the SACKs after the data communication link layer since the the packets need to be unpacked which can be an extremely resource consuming measure due to for example the compression in the link layer 340, 350. The invention will then also be customized to one type of link layer 340, 350, i.e. if a switch is made from ethernet 350 to a PPP with a modem 340 then the system according to the invention has to be reconfigured.

The present invention can be put into apparatus-form either as pure hardware, as pure software or as a combination of hardware and software. If the method according to the invention is realised in the form of software, it can be completely independent or it can be one part of a larger program. The software can suitably be located in a general purpose computer, in a dedicated computer, or a distributed combination thereof.

As a summary, the invention can basically be described as a method of improving the throughput in asymmetrical networks by removing/filtering in an efficient manner completely redundant SACKs only.

The invention is not limited to the embodiments described above but may be varied within the scope of the appended patent claims.

FIG. 1

| | |
|---|---|
| 110 | information source/provider |
| 120 | arbitrary network such as internet |
| 130 | gateway |
| 140 | high speed downlink |
| 150 | information consumer |
| 155 | output queue |
| 160 | gateway |
| 170 | slow uplink |
| 180 | gateway |

FIG. 2

| | |
|---|---|
| 210 | determine if there is a new SACK |
| 220 | determine if there is a previous SACK in the output queue |
| 230 | add new SACK to output queue |
| 240 | compare content as to the same number of blocks |
| 250 | compare content as to if there is a block shift |
| 260 | remove previous SACK from output queue |
| 270 | add new SACK to output queue and sort SACKs in output queue |

FIG. 3

| | |
|---|---|
| 310 | application layer |
| 320 | TCP layer |
| 330 | IP layer |
| 332 | IP layer output queue with SACKs |
| 340 | PPP |
| 350 | Ethernet |
| 360 | output lines |
| 370 | input lines |

What is claimed is:

1. A method of, when receiving information in a network that transports information according to the general principles of the Transmission Control Protocol (TCP), reducing the number of selective acknowledgements (SACK) to be transferred to a sender, characterized in that the method comprises the following steps when a new selective acknowledgement has been generated:

determining if there is a previous selective acknowledgement in a queue to be transferred to the sender, and if there is a previous selective acknowledgment in the queue then further performing the following additional steps;

comparing the content of the new selective acknowledgement with the content of the previous selective acknowledgement;

removing the previous selective acknowledgement from the queue in dependence on the result of the comparison.

2. The method according to claim 1, characterized in that in the additional step of removing the previous selective acknowledgement from the queue, the previous selective acknowledgement is removed from the queue if the previous selective acknowledgement has a different number of blocks than the new selective acknowledgement.

3. The method according to claim 1 or 2, characterized in that in the additional step of removing the previous selective acknowledgement from the queue, the previous selective acknowledgement is removed from the queue if the previous selective acknowledgement has the same number of blocks as the new selective acknowledgement and if only the right edge of the first block is different between the previous selective acknowledgement and the new selective acknowledgement.

4. The method according to claim 1, characterized in that the method further comprises the additional step of:

sorting the selective acknowledgements in the queue as to which blocks are redundant.

5. The method according to claim 4, characterized in that the step of sorting comprises the following block sorting steps:

disassembling into blocks the selective acknowledgements that have not been transferred to a sender;

removing redundant blocks;

assembling the remaining blocks into block sorted selective acknowledgements;

placing the block sorted selective acknowledgements into the queue.

6. The method according to claim 4, characterized in that the step of sorting comprises the following selective acknowledgement steps:

comparing the selective acknowledgements that have not been transferred to a sender;

removing the redundant selective acknowledgements.

7. The method according to any one of claims 4 to 6, characterized in that the step of sorting is performed only if the previous selective acknowledgement has not been removed from the queue.

8. The method according to claim 1, characterized in that the method is performed on a queue in any suitable layer from the TCP layer to after the link layer.

9. The method according to claim 8, characterized in that the method is performed on the internet protocol layer output queue.

* * * * *